US012380197B2

(12) United States Patent
Yamamoto et al.

(10) Patent No.: US 12,380,197 B2
(45) Date of Patent: Aug. 5, 2025

(54) INFORMATION PROVIDING SYSTEM, SERVER DEVICE AND INFORMATION PROVIDING METHOD

(71) Applicant: Sumitomo Electric Industries, Ltd., Osaka (JP)

(72) Inventors: Takashi Yamamoto, Osaka (JP); Masanobu Oe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 206 days.

(21) Appl. No.: 18/271,864

(22) PCT Filed: Jan. 14, 2021

(86) PCT No.: PCT/JP2021/001056
§ 371 (c)(1),
(2) Date: Jul. 12, 2023

(87) PCT Pub. No.: WO2022/153439
PCT Pub. Date: Jul. 21, 2022

(65) Prior Publication Data
US 2024/0086516 A1 Mar. 14, 2024

(51) Int. Cl.
*H04L 29/06* (2006.01)
*G06F 21/36* (2013.01)
*H04L 9/40* (2022.01)

(52) U.S. Cl.
CPC ............ *G06F 21/36* (2013.01); *H04L 63/101* (2013.01)

(58) Field of Classification Search
None
See application file for complete search history.

(56) References Cited

U.S. PATENT DOCUMENTS 10,477,372 B2 * 11/2019 Ray ..................... G05B 19/4186
11,063,965 B1 * 7/2021 Putman ............... H04L 63/1416
(Continued)

FOREIGN PATENT DOCUMENTS

JP 2004-234229 A 8/2004
JP 2015-184851 A 10/2015
(Continued)

OTHER PUBLICATIONS

Stack, Paul. Development of a Mobile Platform to Support Building Maintenance Engineering. 2012 IEEE 36th Annual Computer Software and Applications Conference Workshops. https://ieeexplore.ieee.org/stamp/stamp.jsp?tp=&arnumber=6341623. (Year: 2012)*
(Continued)

Primary Examiner — Jeremiah L Avery
(74) Attorney, Agent, or Firm — XSENSUS LLP

(57) ABSTRACT

The information providing system includes a mobile terminal and a server device that communicates with the mobile terminal. The mobile terminal includes: a sensor that reads a facility ID used to identify at least one facility; and a communication device that transmits, to the server device, the facility ID read by the sensor and a user ID used to identify a user of the mobile terminal. The server device includes: a memory that stores a plurality of types of facility-related information; a processor that extracts, from the plurality of types of facility-related information stored in the memory, facility-related information corresponding to the facility ID and the user ID transmitted from the mobile terminal; and a communication device that transmits, to the mobile terminal, the facility-related information extracted by the processor. The mobile terminal includes a display on which the facility-related information transmitted from the server device is displayed.

8 Claims, 13 Drawing Sheets

(56) References Cited

U.S. PATENT DOCUMENTS

| | | | |
|---|---|---|---|
| 2020/0133257 A1* | 4/2020 | Cella | G05B 19/4183 |
| 2020/0134543 A1* | 4/2020 | Pizzi | G06N 20/00 |
| 2020/0364660 A1* | 11/2020 | Hines | G16H 20/13 |
| 2020/0375457 A1* | 12/2020 | Van Tassel | H04W 12/08 |
| 2021/0119971 A1* | 4/2021 | Radhakrishnan | H04W 4/70 |
| 2021/0120408 A1* | 4/2021 | Pazhyannur | H04L 63/101 |
| 2021/0385190 A1* | 12/2021 | Jasper | G06F 21/31 |

FOREIGN PATENT DOCUMENTS

| | | |
|---|---|---|
| JP | 2016-208214 A | 12/2016 |
| JP | 2019-067262 A | 4/2019 |
| WO | 2019/064536 A1 | 4/2019 |

OTHER PUBLICATIONS

Zeydan, Engin; Dedeoglu, Omer. An Exploratory Data Analytics Platform for Factories of Future. 2019 International Symposium on Networks, Computers and Communications (ISNCC). https://ieeexplore.ieee.org/stamp/stamp.jsp?tp=&arnumber=8909119 (Year: 2019).*

Fanca, Alexandra et al. Evaluating Data Accuracy of Built-In Smartphone Sensors for Mobile Applications. 2018 26th Telecommunications Forum (TELFOR). https://ieeexplore.ieee.org/stamp/stamp.jsp?tp=&arnumber=8611941 (Year: 2018).*

* cited by examiner

FIG.5

FACILITY-RELATED INFORMATION: WORK MANAGEMENT TABLE

| WORK ITEM | RESULT | | | | | | | | |
|---|---|---|---|---|---|---|---|---|---|
| | FACTORY A | | | | | FACTORY B | | | |
| | FACILITY A1 | | FACILITY A2 | | ... | FACILITY B1 | | FACILITY B2 | |
| | 8:00 | 20:00 | 8:00 | 20:00 | ... | 8:00 | 20:00 | 8:00 | 20:00 |
| ROLLER ROTATION NUMBER | 1 | 0 | 1 | 1 | ... | 1 | 1 | 1 | 1 |
| PRESENCE/ABSENCE OF CRACKING | 1 | 1 | 1 | 1 | ... | 1 | 1 | 1 | 1 |
| AIR PRESSURE | 1 | 1 | 1 | 0 | ... | 1 | 0 | 1 | 1 |
| ... | ... | ... | ... | ... | ... | ... | ... | ... | ... |

FIG.6

FACILITY-RELATED INFORMATION: GAS MANAGEMENT TABLE

| DATE | FACTORY A | | | | ... | FACTORY B | | | | ... |
| --- | --- | --- | --- | --- | --- | --- | --- | --- | --- | --- |
| | FACILITY A1 | | FACILITY A2 | | | FACILITY B1 | | FACILITY B2 | | |
| | OXYGEN | CHLORINE | OXYGEN | CHLORINE | ... | OXYGEN | CHLORINE | OXYGEN | CHLORINE | ... |
| DAY 1 | 3119 | 1172 | 2999 | 1074 | ... | 2766 | 1011 | 2721 | 1154 | ... |
| DAY 2 | 3396 | 1274 | 2958 | 1096 | ... | 2748 | 1157 | 2680 | 1208 | ... |
| DAY 3 | 3424 | 1285 | 2997 | 1110 | ... | 2831 | 1201 | 2755 | 1217 | ... |
| ... | ... | ... | ... | ... | ... | ... | ... | ... | ... | ... |
| TOTAL | 61155 | 23094 | 59039 | 21874 | ... | 57344 | 20068 | 55266 | 23554 | ... |

FACILITY-RELATED INFORMATION: PROPERTY MANAGEMENT TABLE

| FACTORY A PROCESSING STEP | FACILITY A1 | | | FACILITY A2 | | |
|---|---|---|---|---|---|---|
| | PRODUCT 1 | PRODUCT 2 | ... | PRODUCT 3 | PRODUCT 4 | ... |
| | PROPERTY α | PROPERTY α | ... | PROPERTY α | PROPERTY α | ... |
| PROCESSING STEP A | α1 | α2 | ... | α3 | α4 | ... |
| PROCESSING STEP B | α1' | α2' | ... | α3' | α4' | ... |
| ... | ... | ... | ... | ... | ... | ... |

FIG.9

FACILITY-RELATED INFORMATION: DEFECT MANAGEMENT TABLE

| DEFECT TYPE | FACTORY A | | | | | | FACTORY B |
|---|---|---|---|---|---|---|---|
| | FACILITY A1 | | | FACILITY A2 | | | |
| | DEFECT COUNT | CUMULATIVE DEFECT COUNT | CUMULATIVE DEFECT RATIO | DEFECT COUNT | CUMULATIVE DEFECT COUNT | CUMULATIVE DEFECT RATIO | |
| CRACKING | 20 | 20 | 40% | 15 | 15 | 33% | ... |
| CHIPPING | 13 | 33 | 66% | 12 | 27 | 60% | ... |
| HEAT CONTROL ERROR | 7 | 40 | 80% | 10 | 37 | 82% | ... |
| ELASTICITY CONTROL ERROR | 6 | 46 | 92% | 5 | 42 | 93% | ... |
| OTHER DEFECTS | 4 | 50 | 100% | 3 | 45 | 100% | ... |

FIG.12

USER MANAGEMENT TABLE

| USER ID | USER NAME | PASSWORD | JOB TITLE | LEVEL OF ACCESS CONTROL | FACILITY-RELATED INFORMATION | | | |
|---|---|---|---|---|---|---|---|---|
| | | | | | WORK ITEM | GAS CONSUMPTION | PROPERTY | DEFECT RATE |
| aaa | A | abc | SUPERVISOR | LOW | 1 | 1 | 1 | 1 |
| bbb | B | bcd | TEAM LEADER | MEDIUM | 1 | 1 | 1 | 0 |
| ccc | C | ced | WORKER | HIGH | 1 | 0 | 0 | 0 |
| ... | ... | ... | ... | ... | ... | ... | ... | ... |

INFORMATION PROVIDING SYSTEM, SERVER DEVICE AND INFORMATION PROVIDING METHOD

CROSS-REFERENCE TO RELATED APPLICATION

The present application is based on PCT/JP2021/001056, filed Jan. 14, 2021, the entire contents of which are incorporated herein by reference.

TECHNICAL FIELD

This disclosure relates to an information providing system, a server device, and an information providing method.

BACKGROUND ART

Japanese Patent Laying-Open No 2004-234229 (PTL 1) discloses a facility monitoring system in which facility-related information is stored in a server device and transmitted by and from the server device to a user's mobile terminal in response to the user's request.

CITATION LIST

Patent Literature

PTL 1: Japanese Patent Laying-Open No. 2004-234229

SUMMARY OF INVENTION

An information providing system according to this disclosure is for use in providing facility-related information of at least one facility. The information providing system includes a mobile terminal and a server device that communicates with the mobile terminal. The mobile terminal includes: a sensor that reads first identification information used to identify at least one facility; and a terminal communication device that transmits, to the server device, the first identification information read by the sensor and second identification information used to identify a user of the mobile terminal. The server device includes: a memory that stores a plurality of types of facility-related information correspondingly to at least one facility; a processor that extracts, from the plurality of types of facility-related information stored in the memory, facility-related information corresponding to the first identification information and the second identification information transmitted from the mobile terminal; and a server communication device that transmits, to the mobile terminal, the facility-related information extracted by the processor. The mobile terminal includes a display on which the facility-related information transmitted from the server device is displayed.

A server device according to this disclosure is for use in providing facility-related information of at least one facility. The server device includes: a memory that stores a plurality of types of facility-related information correspondingly to at least one facility; a processor that extracts, from the plurality of types of facility-related information stored in the memory, facility-related information corresponding to first identification information read by a mobile terminal and used to identify at least one facility and second identification information used to identify a user of the mobile terminal, and a server communication device that transmits, to the mobile terminal, the facility-related information extracted by the processor.

An information providing method according to this disclosure is for use in providing facility-related information of at least one facility. The information providing method includes: extracting, from a plurality of types of facility-related information stored in a memory correspondingly to at least one facility, facility-related information corresponding to first identification information read by a mobile terminal and used to identify at least one facility and second identification information used to identify a user of the mobile terminal; and transmitting, to the mobile terminal, the facility-related information extracted earlier.

BRIEF DESCRIPTION OF DRAWINGS

FIG. 5 is a work management table included in the facility-related information stored in a server device according to the embodiment.

FIG. 6 is a gas management table included in the facility-related information stored in the server device according to the embodiment.

FIG. 9 is a defect management table included in the facility-related information stored in the server device according to the embodiment.

FIG. 12 is a drawing that illustrates a user management table included in the tables for identification purpose stored in the server device according to the embodiment.

DETAILED DESCRIPTION

Figure 1:
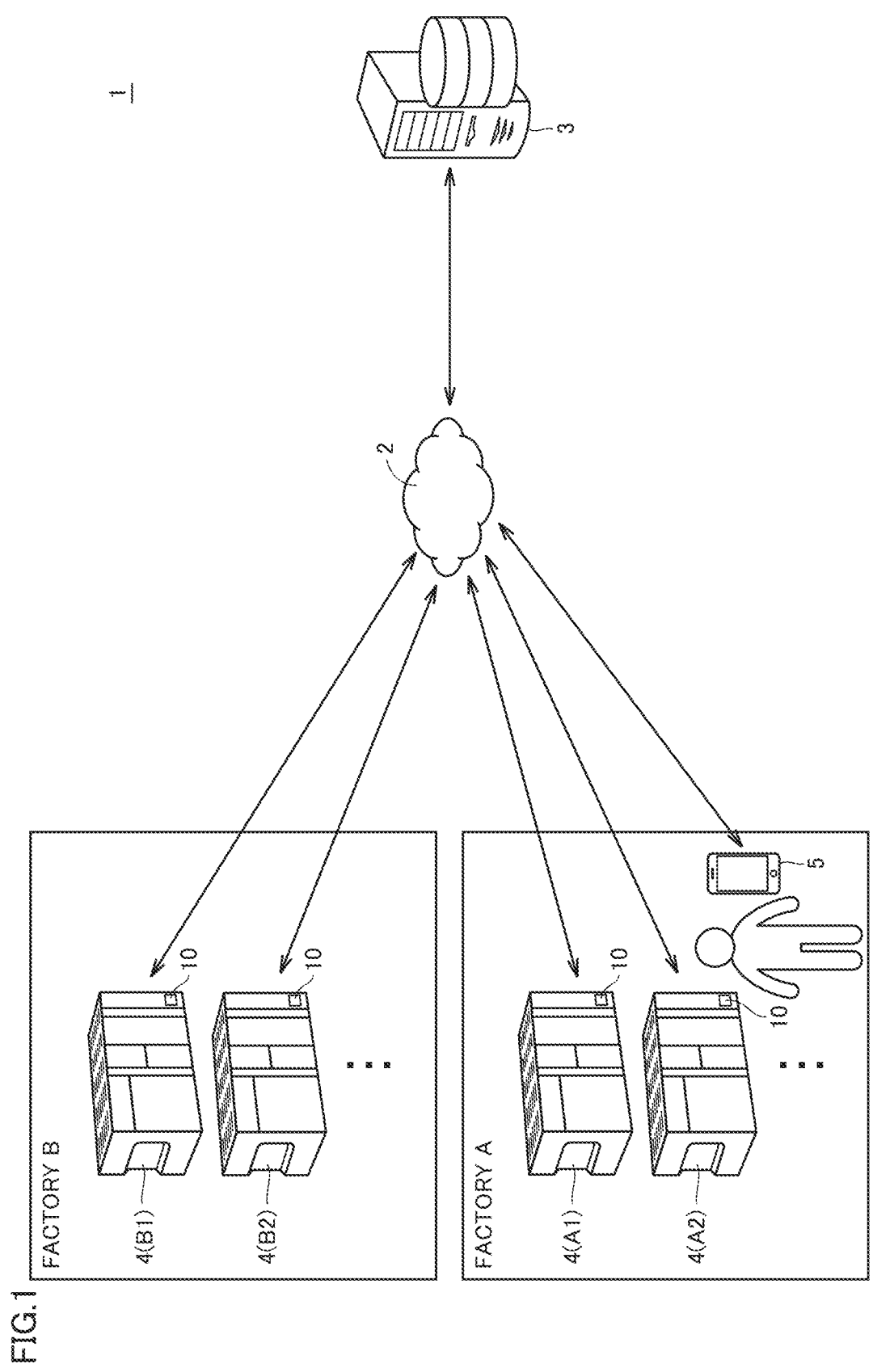
FIG. 1 is a drawing that illustrates an exemplified configuration of an information providing system according to an embodiment.

Problem to be Solved by the Present Disclosure

In the facility monitoring system described in PTL 1, the server device is allowed to provide a user with facility-related information. This facility monitoring system, however, fails to address how users and facility-related information are associated with each other, thus inviting the server device to provide users with facility-related information irrelevant to them.

This disclosure is directed to providing an information providing system, a server device, and an information providing method that allows users to access and receive facility-related information suited to the users.

Advantageous Effect of the Present Disclosure

This disclosure may successfully provide an information providing system, a server device, and an information providing method that allows users to access and receive facility-related information suited to the users.

Description of Embodiments (1) An information providing system 1 according to this disclosure is for use in providing facility-related information of at least one facility 4. Information providing system 1 includes a mobile terminal 5 and a server device 3 that communicates with mobile terminal 5. Mobile terminal 5 includes: a sensor 56 that reads a facility ID used to identify at least one facility 4; and a communication device 52 that transmits, to server device 3, the facility ID read by sensor 56 and a user ID used to identify a user of mobile terminal 5. Server device 3 includes: a memory 33 that stores a plurality of types of facility-related information correspondingly to at least one facility 4; a processor 31 that extracts, from the plurality of types of facility-related information stored in memory 33, facility-related information corresponding to the user ID and the facility ID transmitted from mobile terminal 5; and a communication device 32 that transmits, to mobile terminal 5, the facility-related information extracted by processor 31. Mobile terminal 5 includes a display 54 on which the facility-related information transmitted from server device 3 is displayed.

(2) In information providing system 1 as defined in 1), memory 33 may store a table 333 for identification purpose (user management table). In identification table 333 are defined authorities to access the plurality of types of facility-related information depending on types of the users. Processor 31 may extract, from the plurality of types of facility-related information stored in memory 33, particular facility-related information defined as accessible in table 333 for identification purpose (user management table) based on the user ID.

(3) Information providing system 1 as defined in 1) or 2) may include a plurality of facilities 4 as at least one facility 4. Memory 33 may store the plurality of types of facility-related information correspondingly to respective ones of these facilities 4. Processor 31 may extract, from the plurality of types of facility-related information stored in memory 33, facility-related information corresponding to facility 4 identified based on the facility ID.

(4) Information providing system 1 as defined in 1) or 2) may include a plurality of facilities 4 as at least one facility 4. Memory 33 may store the plurality of types of facility-related information correspondingly to respective ones of these facilities 4. Processor 31 may extract, from the plurality of types of facility-related information stored in memory 33, facility-related information corresponding to another facility 4 that differs from facility 4 identified based on the facility ID.

(5) In information providing system 1 as defined in one of 1) to 4), the plurality of types of facility-related information may include an analysis result of at least one facility 4.

(6) In information providing system 1 as defined in one of 1) to 5), the first identification information may be included in a code 10 attached to at least one facility 4.

(7) A server device 3 according to this disclosure provides facility-related information of at least one facility 4. Server device 3 includes, a memory 33 that stores a plurality of types of facility-related information correspondingly to at least one facility 4, a processor 31 that extracts, from the plurality of types of facility-related information stored in memory 33, facility-related information corresponding to a facility ID read by a mobile terminal 5 and used to identify at least one facility 4 and a user ID used to identify a user of mobile terminal 5; and a communication device 32 that transmits, to mobile terminal 5, the facility-related information extracted by processor 31.

(8) An information providing method according to this disclosure is for use in providing facility-related information of at least one facility 4. The information providing method includes: (S36) extracting, from a plurality of types of facility-related information stored in memory 33 correspondingly to at least one facility 4, facility-related information corresponding to a facility ID read by mobile terminal 5 and used to identify at least one facility 4 and the user ID used to identify a user of mobile terminal 5; and (S37) transmitting, to mobile terminal 5, the facility-related information extracted earlier.

Description of Embodiments

Embodiments according to this disclosure are hereinafter described in detail referring to the accompanying drawings. The same or similar components and units in the description below are simply illustrated with the same reference signs, redundant description of which will basically be omitted.

<Configuration of Information Providing System>

The configuration of an information providing system 1 according to an embodiment is hereinafter described with reference to FIGS. 1 to 4.

FIG. 1 is a drawing that illustrates an exemplified configuration of information providing system 1 according to this embodiment. As illustrated in FIG. 1, information providing system 1 includes at least one facility 4 and a mobile terminal 5. In this embodiment, information providing system 1 includes, as at least one facility 4, a plurality of facilities 4 installed in a plurality of factories. Of these facilities 4, facilities A1 and A2 are installed in a factory A, while facilities B1 and B2 are installed in a factory B. Information providing system 1 may include one facility 4 alone, instead of two or more facilities 4.

Facility 4 is engaged in the manufacture of, for example, automobile parts and circuit boards and is equipped with machines, tools, and apparatuses used to assemble the parts and circuits into finished products. Examples of facility 4 may include electrical facility, gas facility, plumbing installation, conveyance equipment, air conditioning equipment, and lighting facility.

Figures 10, 11:
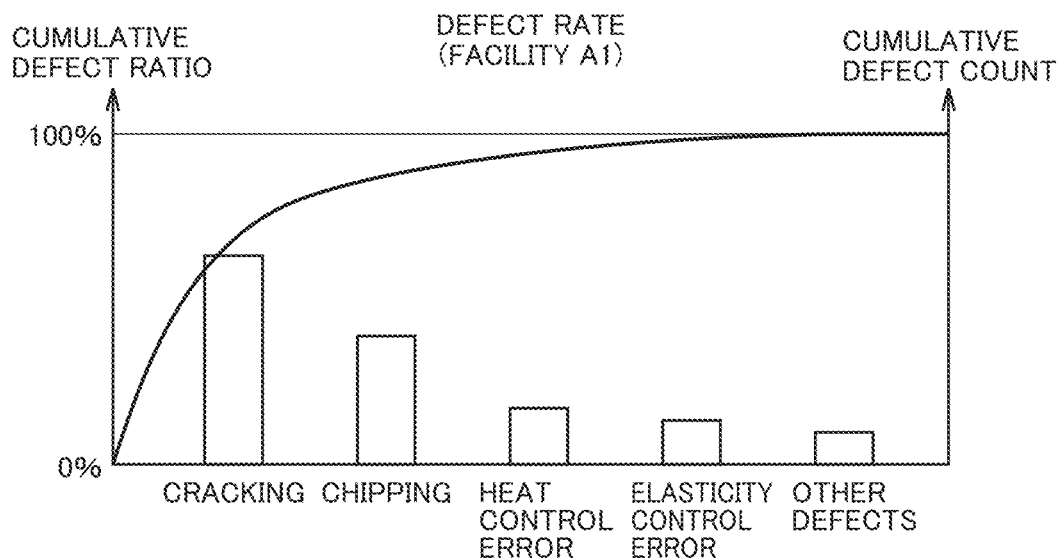
FIG. 10 is a graph of a defect-related analysis result included in the facility-related information stored in the server device according to the embodiment.
FIG. 11 is a drawing that illustrates a facility management table included in tables for identification purpose stored in the server device according to the embodiment.

First identification information is allocated to each of facilities 4. The first identification information is used to identify each facility 4 and may include letters and characters, symbols, numbers and/or codes. An example of the first identification information used in this embodiment is facility ID (identifier), for example, production serial number of facility 4, as illustrated in FIG. 11 described later. The facility ID is included in a code 10 attached to each facility 4. Examples of code 10 include one-dimensional codes like barcodes and two-dimensional codes like QR codes (registered trademark). Different facility MDs are respectively allocated to facilities 4, and facilities 4 are thus discriminable by server device 3 based on their facility IDs.

Mobile terminal 5, examples of which may include smart phone, PDA (personal digital assistant) and tablet PC (personal computer), is an information terminal allowed to communicate with server device 3. Mobile terminal 5 is allowed to read the facility ID allocated to each facility 4 using a sensor 56 described later.

Mobile terminal 5 is carried with and used by a user. Though not illustrated in the drawings, there are a plurality of users in each of factories A and B. These users are, for example, chief supervisors, team leaders, and workers and operators, who are allowed to use facilities 4 installed in the factories.

Second identification information is allocated to each of the users. The second identification information is used to identify each user and may include letters and characters, symbols, numbers and/or codes. An example of the second identification information used in this embodiment is user ID set by a user him/herself, as illustrated in FIG. 12 described later.

Server device 3 disclosed herein is a computer that provides users with facility-related information of at least one facility 4. The facility-related information is information of facility 4, for example, information of operation and work items of facility 4 (hereinafter, may be referred to as "work items"), information of any gas generated in facility 4, properties of products manufactured using facility 4 (parts and components, finished products), defect-related information of products manufactured using facility 4, information of a facility 4-installed production line, and/or information of sensors installed in facility 4.

In this embodiment, server device 3 is installed in a different site apart from factories A and B where facilities 4 are installed. Server device 3 communicates with facility 4 in each factory through a network 2. Server device 3 communicates with mobile terminal 5 carried with each user through network 2. Server device 3 may be installed in one of factories A and B or may functionally operate as a cloud computer and thereby communicate with facility 4 and mobile terminal 5 in each factory.

Figure 2:
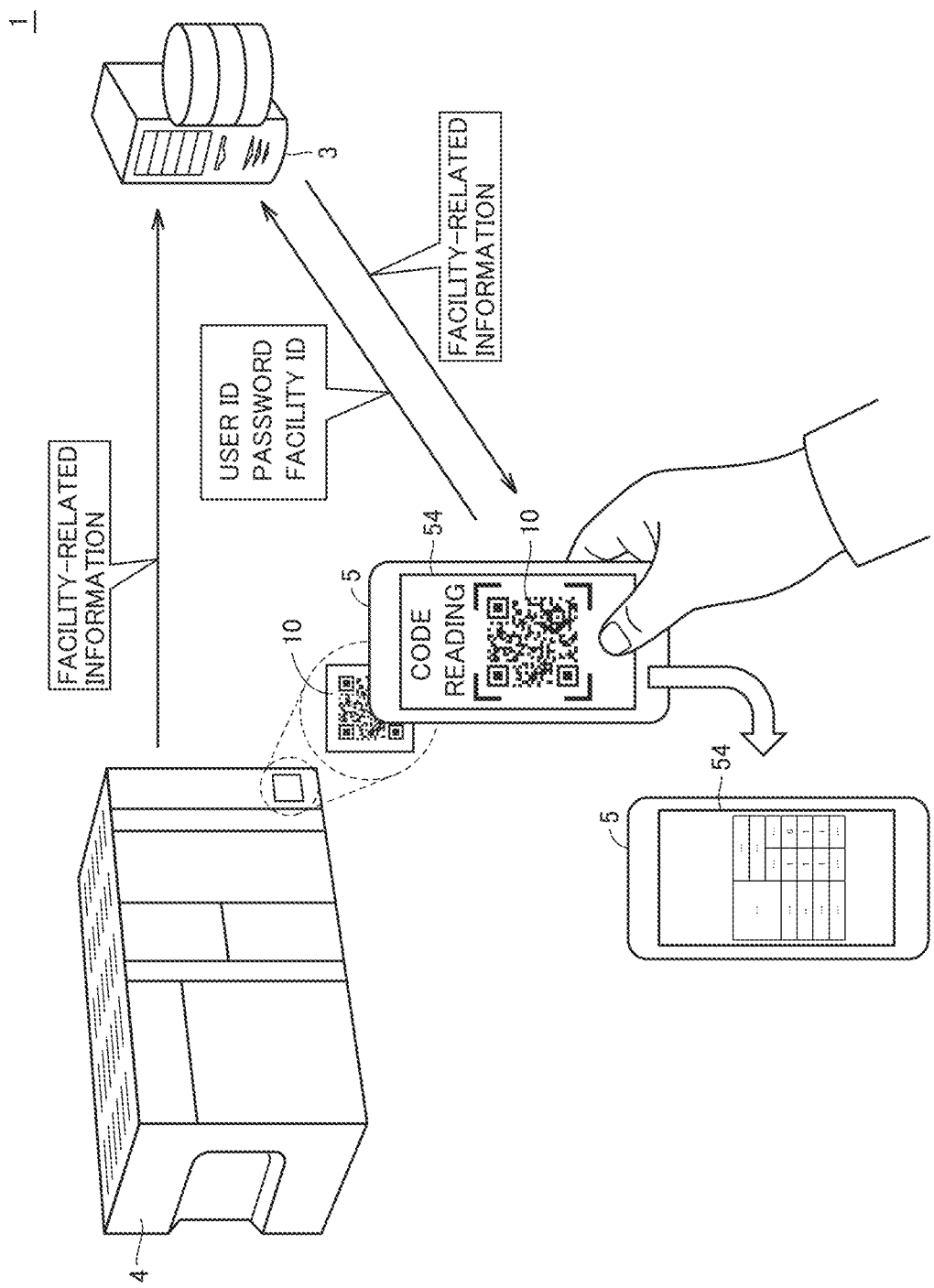
FIG. 2 is a drawing that illustrates a process to provide facility-related information using the information providing system according to the embodiment.

FIG. 2 is a drawing that illustrates a process to provide facility-related information using information providing system 1 according to this embodiment. As illustrated in FIG. 2, facility 4 transmits facility-related information of facility 4 to server device 3. The timing of transmission of the facility-related information by facility 4 may be optionally decided and set by an administrator of facility 4, for example, after the manufacture of products for a certain number of lots is completed in facility 4. Server device 3 obtains the facility-related information transmitted from facilities 4 in the factories and stores the obtained facility-related information successively in memory 33 described later.

Server device 3 collects various pieces of facility-related information from facilities 4 in the factories and provides the collected facility-related information to a user who is requesting information using mobile terminal 5. If server device 3 equally provides all of users, without checking their identities, all types of facility-related information requested, the users may receive totally irrelevant facility-related information from server device 3.

To address this issue, information providing system 1 according to this embodiment is configured to provide a user, who has been identified by server device 3 based on his/her user ID, with a piece(s) of facility-related information relevant to this user.

Specifically, a user inputs, to mobile terminal 5, his/her user ID and password registered beforehand in server device 3. Mobile terminal 5 transmits the inputted user ID and password to server device 3. Based on the user ID obtained from mobile terminal 5, server device 3 identifies the user registered for this user ID and authorizes mobile terminal 5 to access server device 3 if the password is valid.

After the user is authenticated by server device 3, the user, using his/her mobile terminal 5, detects code 10 attached to facility 4 and reads the facility ID included in code 10. Mobile terminal 5 transmits the read facility ID to server device 3. Server device 3, based on the facility ID transmitted from mobile terminal 5, identifies facility 4 with this facility ID.

When a request to access the facility-related information is received from the authenticated user, server device 3 extracts the requested facility-related information. Server device 3 extracts a piece(s) of facility-related information relevant to the authenticated user from a plurality of types of facility-related information stored in memory 33. For instance, server device 3 extracts both of first facility-related information and second facility-related information in response to a request from a certain user, while extracting, of these types of information, the first facility-related information alone in response to a request from another user.

Server device 3 transmits the extracted facility-related information to the user's mobile terminal 5. Mobile terminal 5 presents, on display 54, the facility-related information transmitted from server device 3. Server device 3 provides each of different types of users with a particular piece(s) of facility-related information suited to the user.

Figure 3:
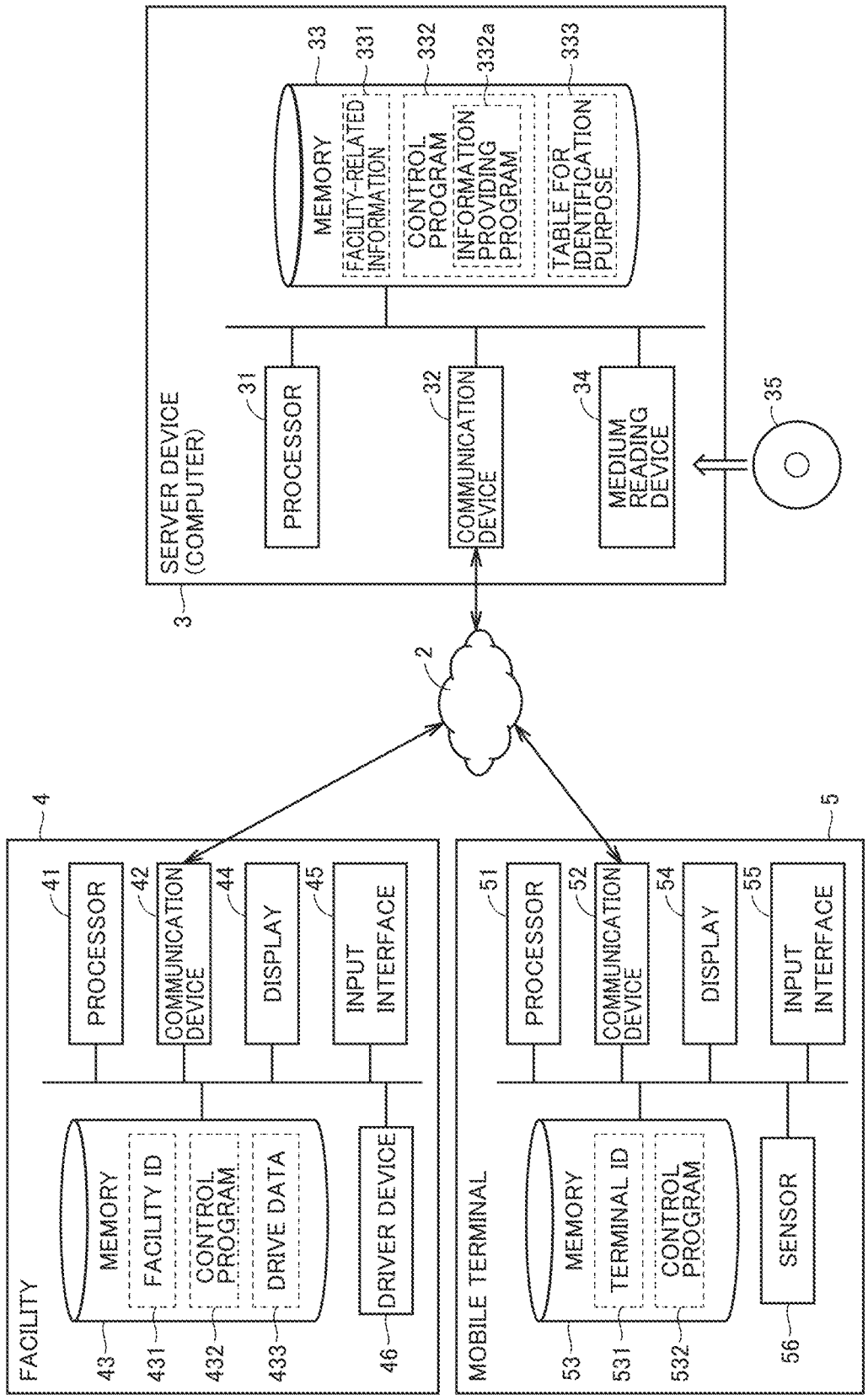
FIG. 3 is a block diagram that illustrates a hardware configuration of the information providing system according to the embodiment.

FIG. 3 is a block diagram that illustrates a hardware configuration of information providing system 1 according to this embodiment. As illustrated in FIG. 3, server device 3 is equipped with a processor 31, a communication device 32, a memory 33, and a medium reading device 34.

Processor 31 is a processing device in charge of running a program(s) (for example, control program 332 described later) to carry out processes related to server device 3. Processor 31 may include, for example, at least one of CPI. (central processing unit), FPGA (field programmable gate array) and GPU (graphics processing unit). Processor 31 may include a processing circuitry.

Communication device 32 builds communication with facility 4 and mobile terminal 5 through network 2 to allow data (information) to be transmitted and received to and from facility 4 and mobile terminal 5.

Memory 33 includes a volatile memory, for example, DRAM (dynamic random access memory) and/or SRAM (static random access memory), or may include a nonvolatile memory, for example, ROM (read only memory), SSD (solid state drive) and/or HDD (hard disk drive). Memory 33 stores facility-related information 331, a control program 332 and tables 333 for identification purpose.

Facility-related information 331 (hereinafter, may be simply referred to as "facility-related information") includes pieces of information of facilities 4 which are obtained from facilities 4 in the factories. Control program 332 is a program for control of components and units in server device 3, inclusive of an information providing program 332a. Information providing program 332a is a program run to provide a user with facility-related information suited to the user in response to his/her request transmitted from mobile terminal 5. Processor 31 runs information providing program 332a to carry out the processing steps of FIG. 15 described later. Identification tables 333 include a facility management table of FIG. 11 containing information used to identify facilities 4 based on the facility IDs, and a user management table of FIG. 12 containing information used to identify users based on the user IDs. These management tables will be described later.

Medium reading device 34 receives a recording medium 35 in which programs and data are recordable and reads the programs and data from recording medium 35. Examples of recording medium 35 may include CD (compact disk), SD card (secure digital card) and USB memory (universal serial bus memory). In this embodiment, medium reading device 34 reads control program 332 (information providing program 332a) stored in recording medium 35 and stores the read control program 332 (information providing program 332a) in memory 33.

Facility 4 is equipped with a processor 41, a communication device 42, a memory 43, a display 44, an input interface 45, and a driver device 46.

Processor 41 is a processing device in charge of running programs (for example, control program 432 described later) to carry out processes related to facility 4. Processor 41 includes at least one of, for example, CPU, FPGA and GPU. Processor 41 may include a processing circuitry.

Communication device 42 builds communication with server device 3 through network 2 to allow data (information) to be transmitted and received to and from server device 3.

Memory 43 includes a volatile memory, for example, DRAM and/or SRAM or may include a non-volatile memory, for example, ROM, SSD and/or HDD. Memory 43 stores a facility ID 431, a control program 432 and a drive data 433.

Facility ID 431 (hereinafter, may be simply referred to as "facility ID") is an example of the first identification information, which is used to identify facility 4. Control program 432 is a program for control of the components and units of facility 4. Drive data 433 includes various pieces of data used to operate driver device 46.

Input interface 45 is an interface through which data inputs concerning the operation and management of facility 4 are receivable. For instance, a user, who is an operator or worker, is allowed to input data through input interface 45 to check the condition of facility 4.

Driver device 46 drives an actuator used in the manufacture of products, not illustrated in the drawings, based on the control by processor 41.

Mobile terminal 5 is equipped with a processor 51, a communication device 52, a memory 53, a display 54, an input interface 55, and a sensor 56.

Processor 51 is a processing device in charge of running programs (for example, control program 532 described later) to carry out processes related to mobile terminal 5. Processor 51 may include, for example, at least one of CPU, FPGA and GPU. Processor 51 may otherwise include a processing circuitry.

Communication device 52 builds communication with server device 3 through network 2 to allow data (information) to be transmitted and received to and from server device 3.

Memory 53 includes a volatile memory, for example, DRAM and/or SRAM or may include a non-volatile memory, for example, ROM, SSD and/or HDD. Memory 53 stores a terminal ID 531 and a control program 532.

Terminal ID 531 is information used to identify mobile terminal 5 and includes the product serial number or IP address (Internet protocol address) of mobile terminal 5. The second identification information, which is the user ID in this embodiment, may instead be terminal ID 531. Control program 532 is a program for control of components and units of mobile terminal 5.

Input interface 55 is an interface through which data inputs to mobile terminal 5 are receivable. For example, the user of mobile terminal 5 is allowed input his/her user ID and password through input interface 55.

Sensor 56 detects code 10 attached to facility 4 and thereby reads facility ID 431 included in this code 10. For example, code 10 may be a barcode or QR code (registered trademark), in which case sensor 56 may be a camera-equipped image sensor.

Figure 4:
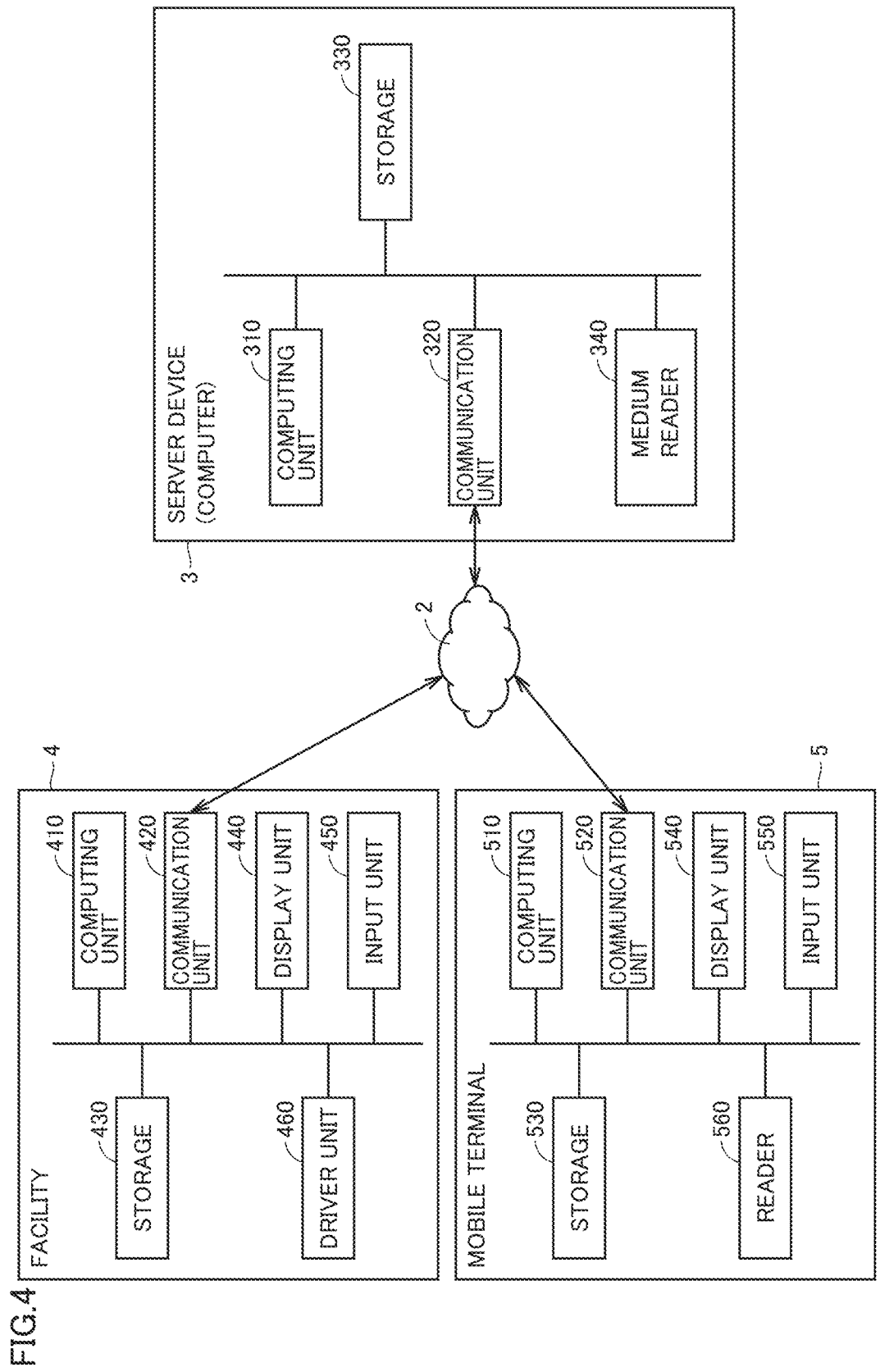
FIG. 4 is a block diagram that illustrates a functional configuration of the information providing system according to the embodiment.

FIG. 4 is a block diagram that illustrates a functional configuration of information providing system 1 according to the embodiment. As illustrated in FIG. 4, principal functional elements of server device 3 include a computing unit 310, a communication unit 320, a storage 330, and a medium reader 340.

Computing unit 310 is a functional element of processor 31, which executes various processes related to server device 3.

Communication unit 320 is a functional element of communication device 32, which allows data (information) to be transmitted and received to and from facility 4 and mobile terminal 5 through network 2.

Storage 330 is a functional element of memory 33. Storage 330 stores various types of information, inclusive of facility-related information obtained from respective facilities 4 in the factories and information used to identify facilities 4 and users.

Medium reader 340 is a functional element of medium reading device 34. Medium reader 340 reads the programs and data stored in recording medium 35 and stores the read programs and data in storage 330.

Principal functional elements of facility 4 include a computing unit 410, a communication unit 420, a storage 430, a display unit 440, an input unit 450, and a driver unit 460.

Computing unit 410 is a functional element of processor 41, which executes various processes related to facility 4.

Communication unit 420 is a functional element of communication device 42, which allows data (information) to be transmitted and received to and from server device 3 through network 2.

Storage 430 is a functional element of memory 43, and stores various types of information concerning facility 4, for example, facility ID 431.

Display unit 440 is a functional element of display 44, which displays thereon images to broadcast various pieces of information.

Input unit 450 is a functional element of input interface 45, which receives data inputs concerning the operation and management of facility 4.

Driver unit 460 is a functional element of driver device 46, which drives an actuator for the manufacture of products, not illustrated in the drawings.

Principal functional elements of mobile terminal 5 include a computing unit 510, a communication unit 520, a storage 530, a display unit 540, an input unit 550, and a reader 560.

Computing unit 510 is a functional element of processor 51, which is in charge of executing various processes related to mobile terminal 5.

Communication unit 520 is a functional element of communication device 52, which allows data (information) to be transmitted and received to and from server device 3 through network 2.

Storage 530 is a functional element of memory 53, and stores various types of information concerning mobile terminal 5, for example, terminal ID 531.

Display unit 540 is a functional element of display 54, which displays thereon images to broadcast various pieces of information.

Input unit 550 is a functional element of input interface 55, which receives data inputs to mobile terminal 5.

Reader 560 is a functional element of sensor 56, which detects code 10 attached to facility 4 and thereby reads facility ID 431 included in this code 10.

<Example of Facility-Related Information>

Facility-related information 331 stored in memory 33 by server device 3 is hereinafter described, with reference to FIGS. 5 to 10. FIG. 5 is a work management table included in facility-related information 331 stored in server device 3 according to this embodiment. In the work management table, information is stored indicating whether work items are completed in each of facilities 4 of in the factories (may be referred to as "work management information), as illustrated in FIG. 5.

The work items stored in the work management table include results on, for example, whether the following work items are completed; roller rotation number in facility 4, presence/absence of cracking in facility 4, and air pressure in facility 4. In the work management table, information of "1" is stored when the completion of each work item is confirmed, while information of "0" is stored otherwise. The results on whether the work items are completed may be inputted to facility 4 by a user or may be automatically stored in facility 4 depending on whether each work item is done. The results may be inputted by a user to a computer not illustrated in the drawings and then into facility 4. Server device 3 obtains these results on whether the work items are completed from each of facilities 4 in the factories and stores the obtained results in the work management table.

An example is given in regard to a facility A1 of a factory A, in which roller rotation number, presence/absence of cracking, and air pressure were checked at 8:00, and presence/absence of cracking and air pressure were checked at 20:00. This example is applied likewise to a facility A2 of factory A and facilities B1 and B2 of a factory B. In the work management table, information of "1" is stored when the completion of each work item is confirmed, while information of "0" is stored otherwise.

Through management of the work items, whether they are completed, in each of facilities 4 in the factories using the work management table, server device 3, in response to a user's request, is thus allowed to provide the user with information on whether any work or operation is done for facility 4 of his/her interest.

FIG. 6 is a gas management table included in facility-related information 331 stored in server device 3 according to this embodiment. In the gas management table, information is stored indicating daily gas consumption and total gas consumption in each of facilities 4 in the factories (may be referred to as "gas management information"), as illustrated in FIG. 6.

The gas management table contains, as types of gases to be used, information indicating the quantities of oxygen and chlorine used. Oxygen and chlorine are just examples, which may be replaced with be any other gases. Server device 3 obtains the gas consumption per day from each of facilities 4 in the factories and stores the obtained result in the gas management table. Further, server device 3 sums the obtained gas consumptions and then stores information indicating its result in the gas management table.

Through management of daily gas consumption in each of facilities 4 in the factories using the gas management table, server device 3, in response to a user's request, is thus allowed to provide the user with the gas consumption in facility 4 of his/her interest on a requested date.

Figures 7, 8:
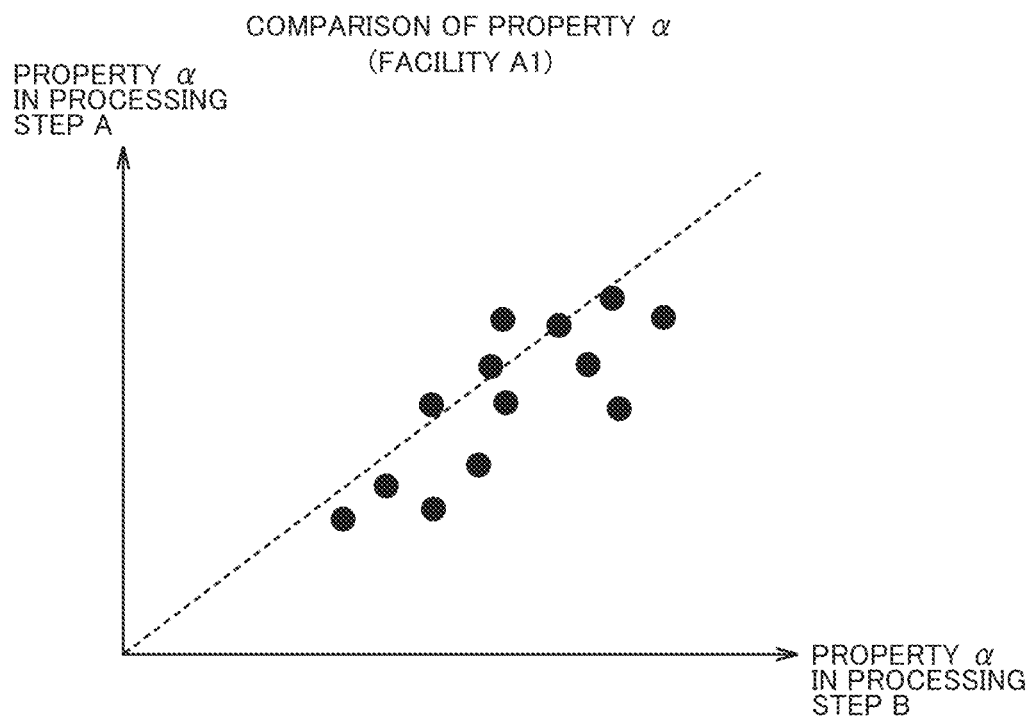
FIG. 7 is a property management table included in the facility-related information stored in the server device according to the embodiment.
FIG. 8 is a graph of a property α analysis result included in the facility-related information stored in the server device according to the embodiment

FIG. 7 is a property management table included in facility-related information 331 stored in server device 3 according to this embodiment. In the property management table, information is stored indicating the values of property $\alpha$ in each processing step for a plurality of products processed in each of facilities 4 in the factories (may be referred to as "property management information), as illustrated in FIG. 7. Property $\alpha$ indicates a property of each product processed in facility 4, examples of which include voltage, electric current, spring's strength, and thermal radiation rate. Server device 3 obtains the value of property $\alpha$ of each product in each processing step from each of facilities 4 in the factories and stores the obtained values in the property management table.

In regard to a product 1 processed in a facility A1 of a factory A, for example, "$\alpha 1$" is stored in the property management table as property $\alpha$ measured in a processing step A, and "$\alpha 1$." is stored in the property management table as property $\alpha$ measured in a processing step B. In the property management table are stored likewise information indicating the values of property $\alpha$ of the following products measured in each processing step, a product 2 processed in facility A1, products 3 and 4 processed in a facility A2 of factory A, and a product processed in facility 4 of factory B.

FIG. 8 is a graph of property $\alpha$ analysis result included in facility-related information 331 stored in server device 3 according to this embodiment. Server device 3 analyzes the values of property $\alpha$ in each processing step that are stored in the property management table and then stores the result of this analysis in memory 33 as facility-related information 331. The property $\alpha$ analysis result is included in the property management information.

FIG. 8 is a scatter diagram presented by server device 3, showing a property $\alpha$ analysis result of products processed in facility A1 in the following steps; processing step A and processing step B that follows processing step A. In the scatter diagram of FIG. 8, its vertical axis represents the values of property $\alpha$ in processing step A, and its horizontal axis represents the values of property $\alpha$ in processing step B. This example of FIG. 8 demonstrates that the values of property $\alpha$ are greater in processing step B than in processing step A.

As described thus far, server device 3, by thus presenting the scatter diagram of the property $\alpha$ values of products for each processing step, is allowed to provide a user with changes of the property $\alpha$ values in any desired facility 4 between processing steps of the user's interest whenever requested by the user.

FIG. 9 is a defect management table included in facility-related information 331 stored in server device 3 according to this embodiment. In the defect management table, information is stored indicating the count of defects, cumulative count of defects and cumulative ratio for each of different types of defects in each of facilities 4 in the factories (hereinafter, may be referred to as "defect management information"), as illustrated in FIG. 9.

The defects storable in the defect management table include, cracking, chipping, heat control error, elasticity control error, and any other defects to be addressed. Server device 3 obtains the counted number of the defects for each defect type from each of facilities 4 in the factories and stores the obtained results in the defect management table.

Further, server device 3 sums the counted numbers of defects, calculates the cumulative ratio for each defect type, and stores information of this result in the defect management table.

FIG. 10 is a graph of a defect-related analysis result included in facility-related information 331 stored in server device 3 according to this embodiment. Server device 3 analyzes the counts of the defects stored in the defect management table per defect type and stores the obtained results in memory 33 as facility-related information 331. The defect analysis result is included in the defect management information.

For instance, server device 3 presents, as illustrated in FIG. 10, a Pareto chart of the count of defects per defect type, cumulative count of defects, and cumulative ratio of defects for each of facilities 4. In the Pareto chart of FIG. 10, its vertical axis on the left represents the cumulative ratio, its horizontal axis represents the defect types, and its vertical axis on the right represents the cumulative count of defects.

Server device 3, by thus presenting the Pareto chart of the count of defects, cumulative count result, and cumulative ratio for different defect types in the drawing in each facility 4, is allowed to successfully provide, to a user, the count of defects, cumulative count result, and cumulative ratio for different defect types in any desired facility 4 whenever requested by the user.

<Exemplified Tables for Identification Purpose>

Next, identification tables 333, which are stored in memory 33 by server device 3, are hereinafter described with reference to FIGS. 1 and 12. FIG. 11 is a drawing that illustrates a facility management table included in identification tables 333 stored in server device 3 according to this embodiment. The facility IDs are each allocated to respective ones of facilities 4 in the factories, and pieces of information of facilities 4 with these facility IDs are storable in the facility management table, as illustrated in FIG. 11.

For example, information of facility A1 in factory A is stored in the facility management table as information of facility 4 with facility ID "AAA1". In regard to the other facilities 4 in factories A and B, information of the facility IDs and facilities 4 with the facility IDs are stored likewise in the facility management table.

Server device 3, by consulting the facility management table, is allowed to identify facility 4 with facility ID obtained from mobile terminal 5.

FIG. 12 is a drawing that illustrates a user management table included in identification tables 333 stored in server device 3 according to this embodiment. User IDs are allocated to users, and pieces of information of the users with the user IDs are storable in the user management table, as illustrated in FIG. 12.

In the user management table, user names, passwords, and job titles that are registered in advance in server device 3 by users themselves are stored as user-related information. In the user management table, access authorities for the facility-related information are defined depending on different types of users. The user management table is an example of the "access authority table" as claimed herein. Server device 3 extracts, from the plurality of types of facility-related information stored in memory 33, a particular piece(s) of facility-related information defined as accessible in the user management table based on the user ID. To be specific, server device 3 defines and sets the levels of access control in the user management table according to the job titles of registered users. The level of access control refers to whether the facility-related information is offered to a user (whether his/her access is allowed) depending on the degrees of importance and confidentiality of facility-related information. In the user management table, information of "1" is stored for user-accessible facility-related information, while information of "0" is stored for user-inaccessible facility-related information. The levels of access control include "low" indicating a user most likely to be granted an access to the facility-related information, "high" indicating a user most unlikely to be granted an access to the facility-related information, and "medium" indicating a user between the high and low levels.

For a user; chief supervisor, who is subject to the low level of access control, server device 3 is allowed to provide this user with the work management information of FIG. 5, gas management information of FIG. 6, property management information of FIGS. 7 and 8, and defect management information of FIGS. 9 and 10. A chief supervisor, who is responsible for knowing details and specifics of facility 4 in the factory, including defect rates, may be a user allowed to extensively access substantially all types of facility-related information.

For a user; team leader, who is subject to the medium level of access control, server device 3 is allowed to provide this user with the work management information of FIG. 5, gas management information of FIG. 6 and property management information of FIGS. 7 and 8, while prohibiting this user from accessing the defect management information of FIGS. 9 and 10. A team leader, who may be not as knowledgeable as a chief supervisor, still needs to have a certain amount of knowledge of facility 4 in the factory. The team leader, therefore, may be a user allowed to access certain pieces of facility-related information including the properties of facility 4.

For a user; worker, who is subject to the high level of access control, server device 3 is allowed to provide this user with the work management information of FIG. 5, while prohibiting this user from accessing the gas management information of FIG. 6, property management information of FIGS. 7 and 8, and defect management information of FIGS. 9 and 10. A worker, who only needs to grasp work-related matters of facility 4 in the factory, may be a user only allowed to access the facility-related information of work items alone due to confidentiality required of the defect rates and properties of facility 4.

<Example of Providing Facility-Related Information>

Figure 13:
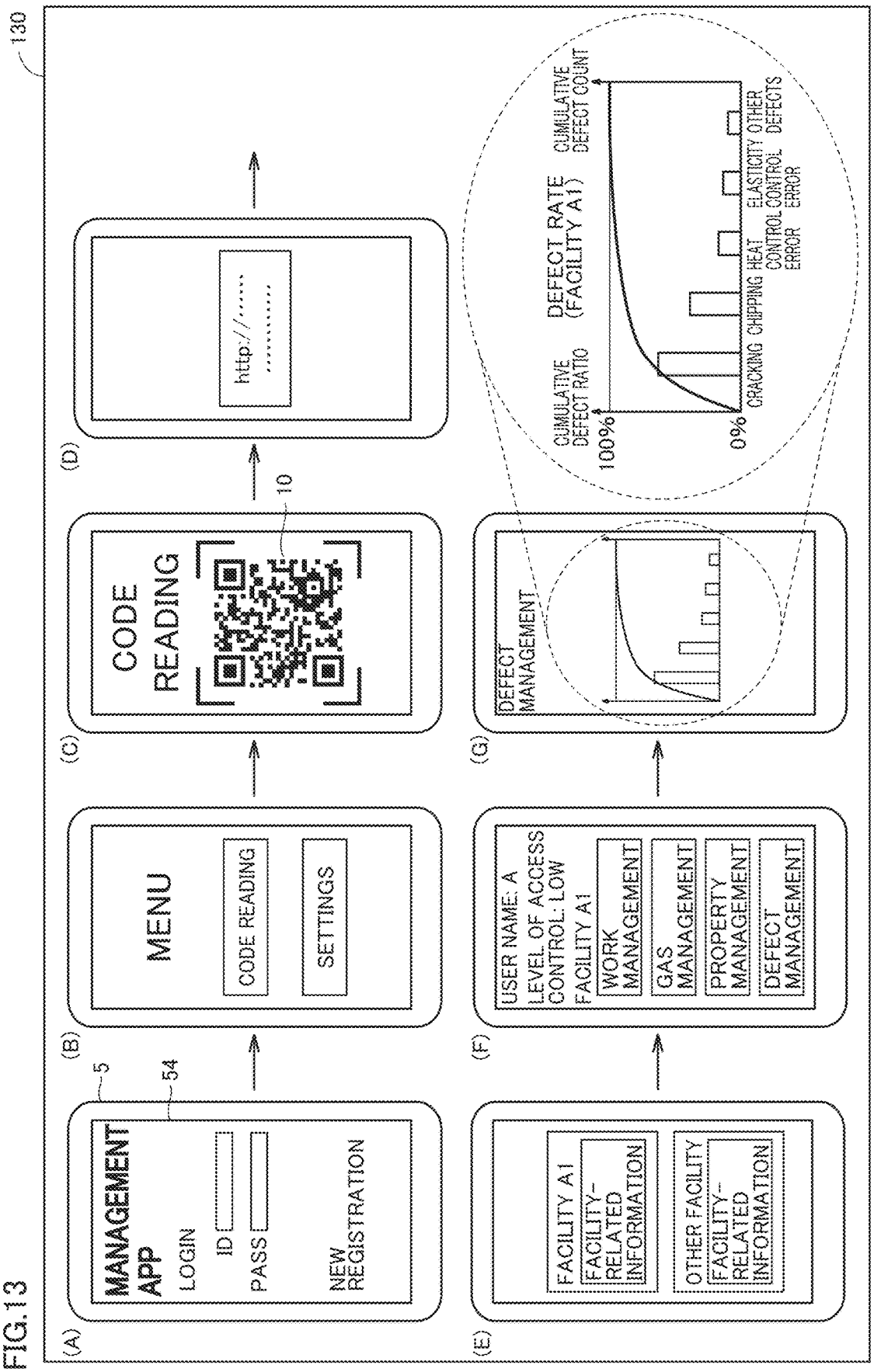
FIG. 13 is a drawing that illustrates indication changes on a mobile terminal display according to the embodiment.

An example of server device 3 providing a user with the facility-related information is hereinafter described with reference to FIGS. 13 and 14. FIG. 13 is a drawing that illustrates indication changes 130 on display 54 of mobile terminal 5 according to this embodiment.

An application program (may be hereinafter referred to as "app") has been downloaded into and installed in a user's mobile terminal 5. This application program allows the user to access and view the facility-related information stored in server device 3. When the user activates the app on mobile terminal 5, a login screen is presented on display 54, as illustrated in FIG. 13 (A). The login screen includes an entry field for user ID input, and an entry field for password input. When the user inputs his/her user ID and password, mobile terminal 5 transmits the user ID and password to server device 3.

When server device 3 authenticates the user based on the received user ID and password, a menu screen is presented on display 54, as illustrated in FIG. 13 (B). The menu screen includes an icon used to read code 10 and an icon for input of settings.

When the user clicks icon for reading code 10, a code-reader screen is presented on display 54 to read code 10, as illustrated in FIG. 13 (C).

When the user focuses the frame of this code-reader screen on code 10 attached to facility 4, sensor 56 detects this code 10. When code 10 is detected, an indication of URL (uniform resource locator) is presented on display 54 to allow the user to access server device 3, as illustrated in FIG. 13 (D).

When the user clicks the indication of URL to access and view the facility-related information of any target facility 4, an icon is presented on display 54 on which the target facility 4 is selectable, as illustrated in FIG. 13 (E). When, for example, the user reads code 10 attached to facility A1 using his/her mobile terminal 5, an icon is displayed on display 54 on which one of facility A1 with read code 10 and facility 4 that differs from facility A1 is selectable. Thus, the user is allowed to access and view the facility-related information of a different facility 4, as well as the facility-related information of facility A1 with read code 10.

When the user selects facility A1, display 54 presents icons for types of facility-related information that may be accessible by the user depending on his/her level of access control, as illustrated in FIG. 13 (F). For a user A who is subject to the low level of access control, for example, display 54 presents an icon for selecting the work management information of FIG. 5, an icon for selecting the gas management information of FIG. 6, an icon for selecting the property management information of FIGS. 7 and 8, and an icon for selecting the defect management information of FIGS. 9 and 10. This user who is subject to the low level of access control is allowed to access and view four different types of facility-related information; work management information, gas management information, property management information, and defect management information.

When the user clicks one of these icons to select a desired piece of facility-related information, the selected piece of facility-related information is presented on display 54, as illustrated in FIG. 13 (G). When the user selects the defect management information, for example, the analysis result of FIG. 10, for example, may be presented on display 54. Thus, any user who is subject to the "low" level of access control is allowed to select, access and view any desired one(s) of the four different types of facility-related information.

Figure 14:
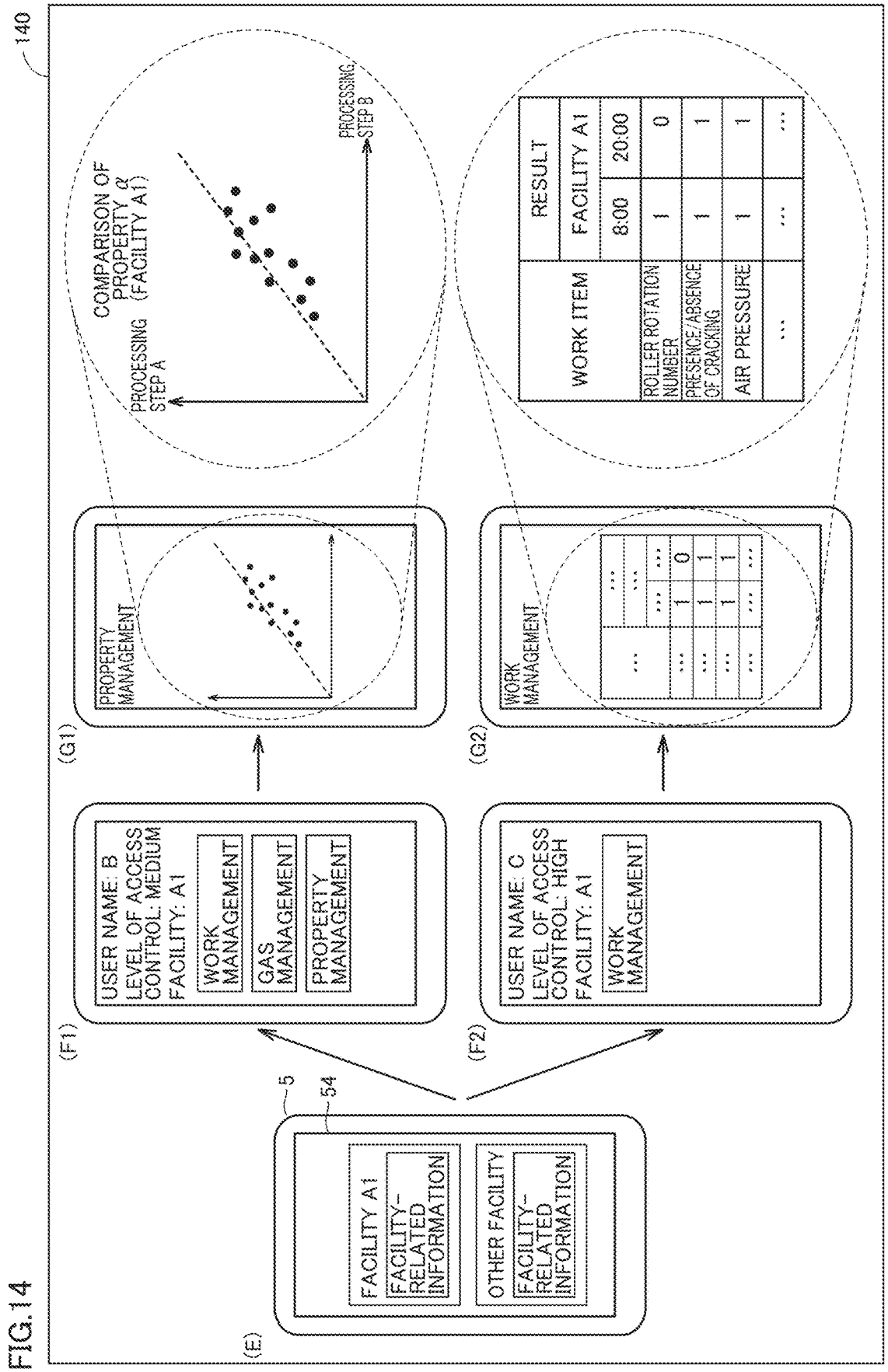
FIG. 14 is a drawing that illustrates indication changes on the mobile terminal display according to the embodiment.

FIG. 14 is a drawing that illustrates indication changes 140 on display 54 of mobile terminal 5 according to this embodiment. As with FIG. 13 (E), when a user, who wants to view the facility-related information, clicks the URL-indicating image, icons are presented on display 54 on which target facility 4 of the user's interest is selectable, as illustrated in FIG. 14 (E).

When the user selects facility A1, an image in one of FIGS. 13 (F), 14 (F1) and 14 (F2) is presented on display 54 depending on the user's level of access control.

For a user B who is subject to the medium level of access control, for example, display 54 presents the icon for selecting the work management information, icon for selecting the gas management information, and icon for selecting the property management information. The icon for selecting the defect management information alone is not presented on display 54. The user who is subject to the medium level of access control is allowed to access and view three different types of facility-related information; work management information, gas management information and property management information.

When the user clicks one of these icons to select a desired piece of facility-related information, the selected piece of facility-related information is presented on display 54, as illustrated in FIG. 14 (G1). When the user selects the property management information, for example, the analysis result of FIG. 8, for example, may be presented on display 54. Thus, any user who is subject to the "medium" level of access control is allowed to select, access and view any desired one(s) of these three different types of facility-related information.

For a user C who is subject to the high level of access control, for example, display 54 presents one icon alone for selecting the work management information. Display 54 does not present the icon for selecting the gas management information, icon for selecting the property management information, or icon for selecting the defect management information. Thus, any user who is subject to the high level of access control is only allowed to access and view the work management information alone.

When the user clicks the icon for selecting the work management information, the work management information of FIG. 5 may be presented on display 54, as illustrated in FIG. 14 (G2). Thus, any user who is subject to the "high" level of access control is allowed to select, access and view only a certain type of selectable facility-related information alone.

<Processing Steps of Information Providing System>

Figure 15:
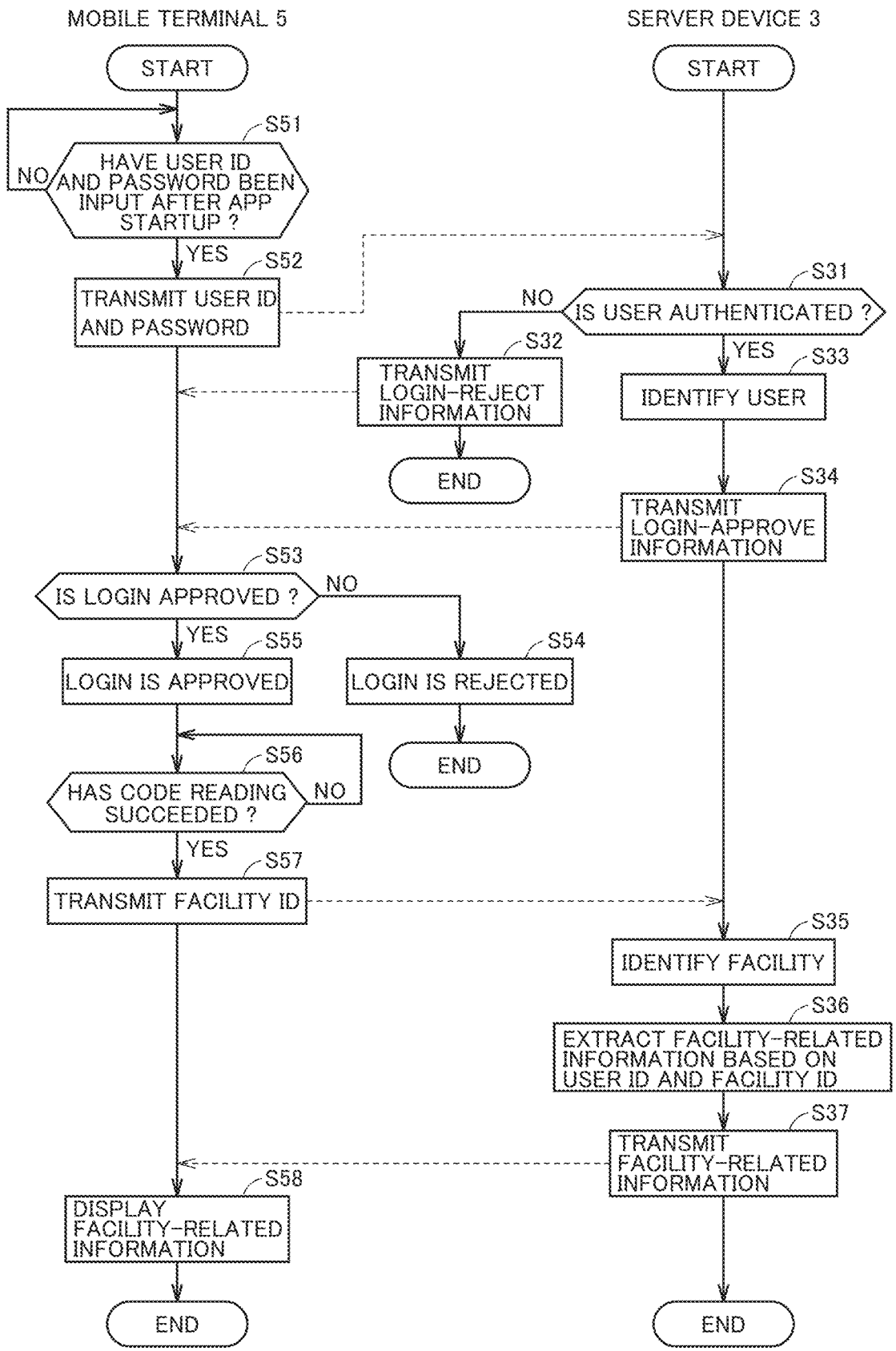
FIG. 15 is a flow chart that illustrates processing steps carried out in the information providing system according to the embodiment.

Steps of a process carried out in information providing system 1 are hereinafter described with reference to FIG. 15. FIG. 15 is a flow chart that illustrates processing steps carried out in information providing system 1 according to this embodiment. The processing steps illustrated in FIG. 15 (hereinafter, may be abbreviated to "S") are feasible by having the following processors run the respective control programs; processor 51 (computing unit 510) of mobile terminal 5 runs control program 532, and processor 31 (computing unit 310) of server device 3 runs control program 332 (information providing program 332a).

As illustrated in FIG. 15, mobile terminal 5 determines, after the app is activated, whether a user's user ID and password have been inputted on the login screen illustrated in FIG. 13 (A) (S51). In case the input of the user ID and password is yet to be done (NO in S51), mobile terminal 5 repeats the processing step of S51. When the input of the user ID and password is confirmed (YES in S51), mobile terminal 5 transmits the user ID and password to server device 3 (S52).

Server device 3 determines, based on the user ID and password transmitted from mobile terminal 5, whether user authentication has been successful (S31). In this processing step, server device 3 determines whether the user ID and password transmitted from mobile terminal 5 are included in user IDs and passwords of a plurality of users registered in the user management table of FIG. 12.

In case the user ID and password transmitted from mobile terminal 5 are not found in the user IDs and passwords of a plurality of users registered in the user management table, server device 3 skips the user authentication (NO in S31) and then transmits login-reject information to mobile terminal 5 (S32) and ends this process.

When the user ID and password transmitted from mobile terminal 5 are found in the user IDs and passwords of a plurality of users registered in the user management table, server device 3 authenticates (YES in S31) and then identifies (S33) this user. Then, server device 3 transmits login-approve information to mobile terminal 5 (S34).

Mobile terminal 5 determines whether the login is authorized by server device 3 based on the login-reject information or login-approve information transmitted from server device 3 (S53).

In case the login is not approved by server device 3 (NO in S53), mobile terminal 5 rejects the login (S54) and ends this process.

When the login is approved by server device 3 (YES in S53), mobile terminal 5 authorizes the login (S55). In this instance, a menu screen is presented on display 54 of mobile terminal 5, as illustrated in FIG. 13 (13).

When the user clicks the code 10-reader icon on the menu screen, mobile terminal 5 determines whether code 10 has been read by sensor 56 (S56). In case code 10 fails to be read (NO in S56), mobile terminal 5 repeats the processing step of S56. When code 10 is successfully read (YES in S56), mobile terminal 5 transmits the facility ID included in the read code 10 to server device 3 (S57).

Server device 3, by consulting the facility management table of FIG. 11, identifies facility 4 corresponding to facility ID with the facility ID transmitted from mobile terminal 5 (S35). Then, server device 3 extracts, from a plurality of types of facility-related information stored in memory 33, a piece(s) of facility-related information relevant to the user ID and facility ID transmitted from mobile terminal 5 (S36).

For example, server device 3, based on the level of access control of the user identified in S33 and facility 4 identified in S35, extracts the facility-related information of the identified facility 4. When the user's level of access control is found to be low, server device 3 extracts the work management information, gas management information, property management information, and defect management information. When the user's level of access control is found to be medium, server device 3 extracts the work management information, gas management information, and property management information, while leaving the defect management information unextracted. When the user's level of access control is found to be high, server device 3 does not extract the gas management information, property management information or defect management information but extracts the work management information alone. The extracted facility-related information is the information of facility 4 whose code 10 was read by the user. Server device 3 transmits the extracted facility-related information to mobile terminal 5 (S37).

When facility 4 whose code 10 was read is selected by the user, as illustrated in FIG. 13 (F), mobile terminal 5 presents, on display 54, the facility-related information extracted by server device 3 (S58) and then ends this process. In the processing step of S58 described earlier, facility 4, code 10 of which was reads is selected by the user. In case the user selects a different facility 4 in a different factory, a piece(s) of facility-related information allowed for the user's level of access control alone is presented on display 54 of mobile terminal 5, among all of pieces of facility-related information of the selected facility 4.

In information providing system 1, a piece(s) of facility-related information corresponding to the user ID and the facility ID read by sensor 56 of mobile terminal 5 is extracted from a plurality of types of facility-related information stored in memory 33 of server device 3, and the extracted piece(s) of facility-related information is presented on display 54 of mobile terminal 5. Thus, server device 3, depending on users' different levels of access control, provides each user with a piece(s) of facility-related information suited to the user <Operational Effects>

In information providing system 1, server device 3 extracts, from a plurality of types of facility-related information concerning facilities 4 stored in memory 33, a piece(s) of facility-related information corresponding to the user ID used to identify a user of the mobile terminal and facility ID read by sensor 56 of mobile terminal 5, and mobile terminal 5 presents the extracted piece(s) of facility-related information on display 54. Information providing system 1 thus characterized may successfully provide a user with facility-related information suited to the user in view of the degrees of importance and confidentiality of various pieces of facility-related information.

In information providing system 1 characterized as described thus far, server device 3, as illustrated in FIG. 12, defined and sets a plurality of different levels of access control for different types of users and extracts a piece(s) of facility-related information corresponding to each user's level of access control from a plurality of types of facility-related information stored in memory 33. For a user; chief supervisor, who is subject to the low level of access control, server device 3 extracts the work management information, gas management information, property management information, and defect management information and provides the user with these pieces of extracted information. For a user; team leader, who is subject to the medium level of access control, server device 3 extracts the work management information, gas management information and property management information and provides the user with these pieces of extracted information, while prohibiting this user from accessing the defect management information. For a user, worker, who is subject to the high level of access control, server device 3 extracts the work management information and provides the user with this extracted information, while prohibiting this user from accessing the gas management information, property management information, and defect management information. Thus, information providing system 1, depending on different types of users, may successfully provide each user with a piece(s) of facility-related information suited to the user.

In information providing system 1 characterized as described thus far, server device 3 stores, in memory 33, the facility-related information of each of facilities 4 installed in a plurality of factories. Then, server device 3 extracts, from a plurality of types of facility-related information stored in memory 33, a piece(s) of facility-related information concerning facility 4 identified based on the facility ID transmitted from mobile terminal 5 and provides a user with the extracted piece of facility-related information. Information providing system 1 thus characterized may successfully provide a user with facility-related information of facility 4, code 10 of which was read by the user using his/her mobile terminal 5. This may allow the user to access the facility-related information of any desired facility 4, improving user-friendliness of this information providing system 1.

In information providing system 1 characterized as described thus far, server device 3 stores, in memory 33, the facility-related information of each of facilities 4 installed in a plurality of factories. Then, server device 3 extracts, from a plurality of types of facility-related information stored in memory 33, a piece(s) of facility-related information concerning another facility 4 that differs from facility 4 identified based on the facility ID transmitted from mobile terminal 5 and provides a user with the extracted facility-related information. Information providing system 1 thus characterized may successfully provide a user with facility-related information of another facility 4 that differs from facility 4, code 10 of which was read by the user using his/her mobile terminal 5. This may allow the user to access the facility-related information of any desired facility 4, improving user-friendliness of this information providing system 1.

In information providing system 1, server device 3 includes, as the facility-related information, an analysis result of facility 4. For example, server device 3 stores, in memory 33, an analysis result of property α values obtained from a processing step A and a subsequent processing step B as the facility-related information, as illustrated in FIG. 8. Thus, information providing system 1 may successfully provide a user with not only the current facility-related information but also the past facility-related information in response to the user's request for the facility-related information of facility 4 and may also successfully provide the user with a comparison result of pieces of current and past facility-related information. As illustrated in FIG. 10, server device 3 stores, in memory 33, defect rate analysis results obtained from defect types as the facility-related information. Thus, information providing system 1 may successfully provide a user with an analysist result of different products processed in facility 4 in response to the user's request for the facility-related information of facility 4.

In information providing system 1, mobile terminal 5, by reading code 10 attached to facility 4 using sensor 56, is allowed to read facility ID. Thus, information providing system 1 may successfully and readily provide a user with the facility-related information of any facility 4 located near the user.

<Modified Example>

In information providing system 1 according to the earlier embodiment, each facility 4 transmits the facility-related information to server device 3 directly through network 2. Instead, a PLC (programmable logic controller) programmed to collectively control a plurality of facilities 4 may be used. In this instance, the PLC obtains the facility-related information of each facility 4 and transmit the obtained facility-related information to server device 3 through network 2. Optionally, a sensor(s) installed in each facility 4 or a sensor(s) connected to each facility 4 may transmit the facility-related information to server device 3 through network 2.

In information providing system 1, server device 3 may provide a user with the facility-related information as described below. Server device 3 may provide a user with the facility-related information obtained from one facility 4 installed in one factory (facility 4 whose code 10 was read). Server device 3 may provide a user with the current or past facility-related information obtained from one facility 4 installed in one factory (facility 4 whose code 10 was read). Server device 3 may provide a user with an analysis result of facility-related information obtained from one facility 4 installed in one factory (facility 4 whose code 10 was read).

Server device 3 may provide a user with pieces of facility-related information obtained from a plurality of facilities 4 installed in one factory (facilities 4 including facility 4 whose code 10 was read). Server device 3 may provide a user with pieces of current or past facility-related information obtained from a plurality of facilities 4 installed in one factory (facilities 4 including facility 4 whose code 10 was read). Server device 3 may provide a user with an analysis result of pieces of facility-related information obtained from a plurality of facilities 4 installed in one factory (facilities 4 including facility 4 whose code 10 was read).

Server device 3 may provide a user with the facility-related information obtained from another facility 4 installed in any other factory but a certain factory (facility 4 that differs from facility 4 whose code 10 was read). Server device 3 may provide a user with the current or past facility-related information obtained from another facility 4 installed in any other factory but a certain factory (facility 4 that differs from facility 4 whose code 10 was read). Server device 3 may provide a user with an analysis result of facility-related information obtained from another facility 4 installed in any factory but a certain factory (facility 4 that differs from facility 4 whose code 10 was read).

Server device 3 may provide a user with an analysis result of pieces of facility-related information of one facility 4 installed in one factory (facility 4 whose code 10 was read) and of another facility 4 installed in the same factory (facility 4 that differs from facility 4 whose code 10 was read). Server device 3 may provide a user with an analysis result of pieces of facility-related information of one facility 4 installed in one factory (facility 4 whose code 10 was read) and of another facility 4 installed in another factory (facility 4 that differs from facility 4 whose code 10 was read).

Code 10 may not necessarily be attached directly to facility 4. Code 10 may be attached to any other suitable object apart from facility 4. Code 10 may not necessarily be a one-dimensional code like barcode or a two-dimensional code like QR code (registered trademark). Code 10 may instead be one of IC tags (integrated circuit tags), for example, passive or active tags like RFID (radio frequency identifier) or Bluetooth (registered trademark) tags. In this instance, sensor 56 may be a reader adapted to read such IC tags.

The facility-related information may not necessarily be limited to the work management information, gas management information, property management information, or defect management information. The facility-related information may instead be any type of information concerning facility 4. For instance, the facility-related information may contain sales-related information and/or inventory-related information of products manufactured in facility 4. The facility-related information may contain information of the surrounding environment of facility 4, for example, a factory, hospital or warehouse where facility 4 is installed.

The timing of analysis of the facility-related information by server device 3 may be an optional timing, for example, timing in response to storage of the facility-related information in memory 33, periodical timing, or timing of receipt of a user's request.

The embodiments and examples disclosed herein are given by way of example in all aspects and should not be construed as limiting the scope of this disclosure. The scope of this disclosure is solely defined by the appended claims and is intended to cover the claims, equivalents, and all of possible modifications made without departing the scope of this disclosure.

REFERENCE SIGNS LIST

1: information providing system,
2: network, 3: server device, 4: facility, 5: mobile terminal, 10: code, 31, 41, 51: processor, 32, 42, 52: communication device, 33, 43, 53: memory, 34: medium reading device, 35: recording medium, 44, 54: display, 45, 55: input interface, 46: driver device, 56: sensor, 310, 410, 510: computing unit, 320, 420, 520: communication unit, 330, 430, 530: storage, 331: facility-related information, 332, 432, 532: control program, 332a information providing program, 333: table for identification purpose, 340: medium reader, 431: facility ID, 433: drive data, 440, 540: display unit, 450, 550: input unit, 460: driver unit, 560: reader, 531: terminal ID

The invention claimed is:

1. An information providing system for use in providing facility-related information of at least one facility, the information providing system comprising:
a mobile terminal; and
a server device that communicates with the mobile terminal,
the mobile terminal comprising:
a sensor that reads first identification information used to identify the at least one facility; and
a terminal communication device that transmits, to the server device, the first identification information read by the sensor and second identification information used to identify a user of the mobile terminal,
the server device comprising:
a memory that stores a plurality of types of facility-related information correspondingly to the at least one facility;
a processor that extracts, from the plurality of types of facility-related information stored in the memory, the facility-related information corresponding to the first identification information and the second identification information transmitted from the mobile terminal; and
a server communication device that transmits, to the mobile terminal, the facility-related information extracted by the processor,
the mobile terminal comprising a display on which the facility-related information transmitted from the server device is displayed.

2. The information providing system according to claim 1, wherein
the memory stores an access authority table defining authorities to access the facility-related information depending on types of the users, and
the processor extracts, from the plurality of types of facility-related information stored in the memory, the facility-related information defined as accessible in the access authority table based on the second identification information.

3. The information providing system according to claim 1, comprising a plurality of facilities as the at least one facility, wherein
the memory stores the plurality of types of facility-related information correspondingly to respective ones of the plurality of facilities, and
the processor extracts, from the plurality of types of facility-related information stored in the memory, the facility-related information corresponding to a facility identified based on the first identification information.

4. The information providing system according to claim 1, comprising a plurality of facilities as the at least one facility, wherein
the memory stores the plurality of types of facility-related information correspondingly to respective ones of the plurality of facilities, and
the processor extracts, from the plurality of types of facility-related information stored in the memory, the facility-related information corresponding to another facility that differs from a facility identified based on the first identification information.

5. The information providing system according to claim 1, wherein the plurality of types of facility-related information include an analysis result of the at least one facility.

6. The information providing system according to claim 1, wherein the first identification information is included in a code attached to the at least one facility.

7. A server device for providing facility-related information of at least one facility, the server device comprising:
a memory that stores a plurality of types of facility-related information correspondingly to the at least one facility;
a processor that extracts, from the plurality of types of facility-related information stored in the memory, the facility-related information corresponding to first identification information read by a mobile terminal and used to identify the at least one facility and second identification information used to identify a user of the mobile terminal; and
a server communication device that transmits, to the mobile terminal, the facility-related information extracted by the processor.

8. An information providing method for use in providing facility-related information of at least one facility, the information providing method comprising:
extracting, from a plurality of types of facility-related information stored in a memory correspondingly to the at least one facility, the facility-related information corresponding to first identification information read by a mobile terminal and used to identify the at least one facility and second identification information used to identify a user of the mobile terminal; and
transmitting, to the mobile terminal, the facility-related information extracted earlier.

* * * * *